(12) United States Patent
Shinozaki

(10) Patent No.: US 9,565,408 B2
(45) Date of Patent: Feb. 7, 2017

(54) PROJECTION APPARATUS, GEOMETRIC CORRECTION ADJUSTMENT METHOD, AND STORAGE MEDIUM STORING CODES FOR GEOMETRIC CORRECTION ADJUSTMENT

(71) Applicant: Casio Computer Co., Ltd, Tokyo (JP)

(72) Inventor: Yoshihiko Shinozaki, Tachikawa (JP)

(73) Assignee: CASIO COMPUTER CO., LTD. (JP)

( * ) Notice: Subject to any disclaimer, the term of this patent is extended or adjusted under 35 U.S.C. 154(b) by 76 days.

(21) Appl. No.: 14/575,690

(22) Filed: Dec. 18, 2014

(65) Prior Publication Data

US 2015/0181183 A1 Jun. 25, 2015

(30) Foreign Application Priority Data

Dec. 19, 2013 (JP) .................................. 2013-262307

(51) Int. Cl.
*H04N 9/31* (2006.01)
(52) U.S. Cl.
CPC .................................. *H04N 9/3185* (2013.01)
(58) Field of Classification Search
CPC   H04N 9/3185; H04N 5/44513; H04N 21/485; H04N 21/431; H04N 21/440263; H04N 21/4122
See application file for complete search history.

(56) References Cited

U.S. PATENT DOCUMENTS

2003/0222892 A1* 12/2003 Diamond ............. H04N 9/3185
  345/647
2003/0231261 A1* 12/2003 Bassi ................... H04N 9/3141
  348/745
2005/0162624 A1* 7/2005 Miyasaka ............... G03B 21/26
  353/101
2006/0050243 A1* 3/2006 Huewel .................. G03B 21/14
  353/69
2009/0278999 A1* 11/2009 Ofune ................. H04N 5/44513
  348/745

(Continued)

FOREIGN PATENT DOCUMENTS

JP 2004-274283 A 9/2004
JP 2006-227441 A 8/2006

(Continued)

OTHER PUBLICATIONS

European Search Report dated on Jun. 30, 2015, for European Patent Application No. 14198184.5. (10 pages).

*Primary Examiner* — Brian Yenke
*Assistant Examiner* — Sean Haiem
(74) *Attorney, Agent, or Firm* — Fitch Even Tabin & Flannery LLP

(57) ABSTRACT

A projection apparatus includes a projection optical system, an output display element, an operation unit acquiring an adjustment instruction, a geometric correction adjustment unit, and a geometric correction unit. The output display element having an element region including pixels that modulate projection light by a quadrangular effective element region in the element region. The geometric correction adjustment unit transforms the effective element region to shift a vertex of the effective element region along a side, according to the adjustment instruction. The geometric correction unit performs an operation of projecting an input image on the effective element region.

9 Claims, 17 Drawing Sheets

(56) References Cited

U.S. PATENT DOCUMENTS

| | | | | |
|---|---|---|---|---|
| 2011/0007278 A1* | 1/2011 | Huber | ............... | G03B 35/18 |
| | | | | 353/7 |
| 2011/0038042 A1* | 2/2011 | Redmann | ............... | G03B 35/18 |
| | | | | 359/462 |
| 2013/0083058 A1* | 4/2013 | Yoshimura | ............... | H04N 5/74 |
| | | | | 345/629 |
| 2014/0104582 A1* | 4/2014 | Mori | ............... | H04N 9/3185 |
| | | | | 353/30 |
| 2014/0111536 A1* | 4/2014 | Shinozaki | ............... | G09G 5/37 |
| | | | | 345/589 |

FOREIGN PATENT DOCUMENTS

| | | |
|---|---|---|
| JP | 2010-250041 A | 11/2010 |
| JP | 2013-77958 A | 4/2013 |

\* cited by examiner

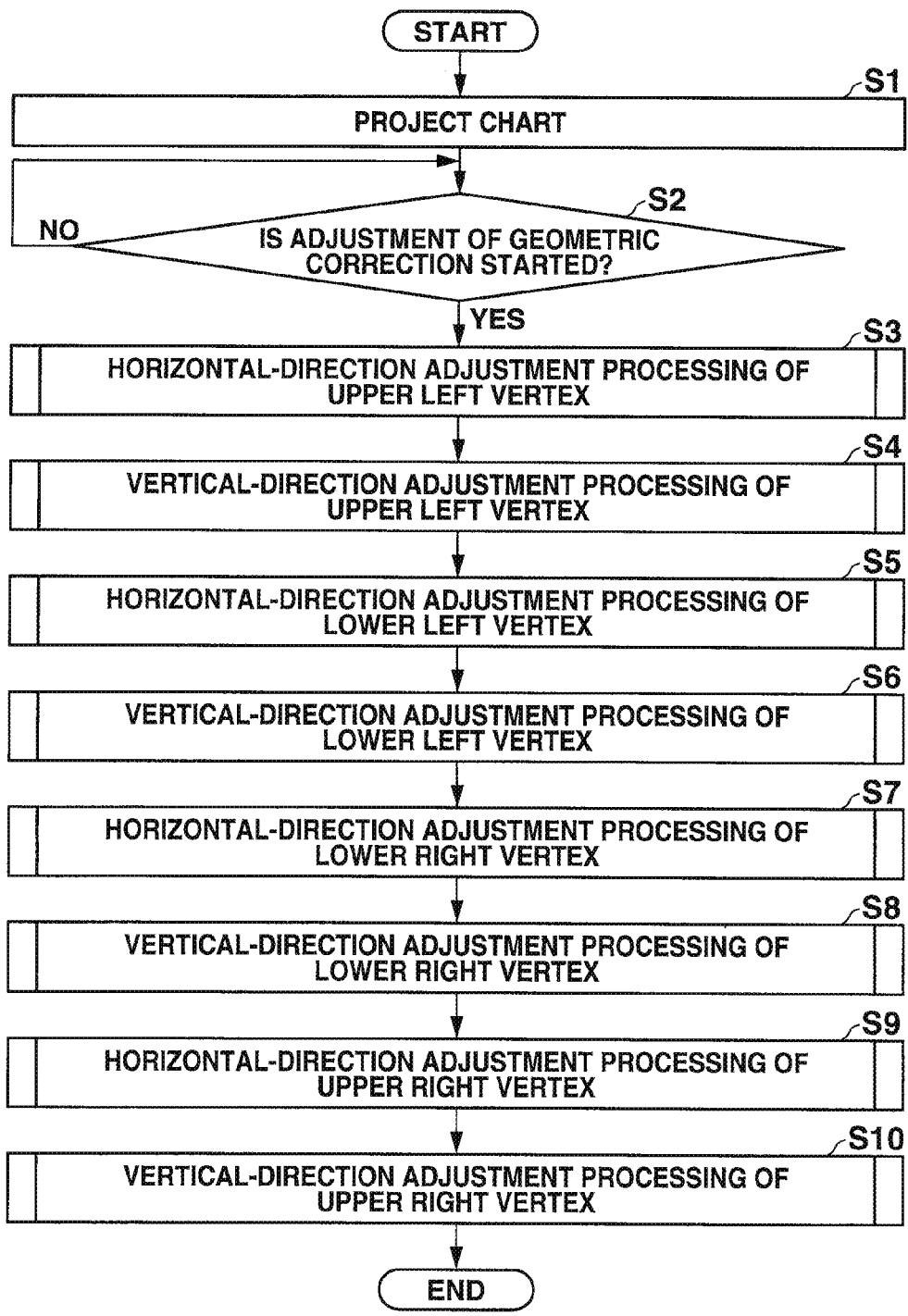

PROJECTION APPARATUS, GEOMETRIC CORRECTION ADJUSTMENT METHOD, AND STORAGE MEDIUM STORING CODES FOR GEOMETRIC CORRECTION ADJUSTMENT

CROSS-REFERENCE TO RELATED APPLICATIONS

This application is based upon and claims the benefit of priority from prior Japanese Patent Applications No. 2013-262307, filed Dec. 19, 2013, the entire contents of which are incorporated herein by reference.

BACKGROUND OF THE INVENTION

1. Field of the Invention

The present invention relates to a projection apparatus, a geometric correction adjustment method, and a storage medium storing codes for geometric correction adjustment.

2. Description of the Related Art

In general, a projector has been known as an image projection apparatus that projects an image on a projection target object, such as a screen based on image data output from, for example, a personal computer. In the case of installing such a projector, a projection region of the projector is adjusted with respect to the projection target object, such as the screen. For example, Jpn. Pat. Appln. KOKAI publication No. 2006-227441 discloses a technology of shifting a vertex of the projection region by moving a cursor to transform a projection region and consequently performing adjustment of geometric correction.

BRIEF SUMMARY OF THE INVENTION

It is desirable that projection region adjustment associated with geometric correction is capable of being easily performed. Therefore, an object of the present invention is to provide a projection apparatus, a geometric correction adjustment method, and a computer readable storage medium storing codes for geometric correction adjustment for easy adjustment of geometric correction.

According to an aspect of the present invention, a projection apparatus includes a projection optical system configured to project projection light on a projection target object; an output display element having an element region including a plurality of pixels that modulate the projection light and configured to generate a projection image configured to be projected on the projection target object based on an input image by a quadrangular effective element region included in the element region; an operation unit configured to acquire an adjustment instruction from a user to adjust the effective element region in the element region; a geometric correction adjustment unit configured to transform the effective element region in the element region to shift a vertex of the effective element region along at least one side of two sides, each of the two sides having one end that is the vertex to be shifted, according to the adjustment instruction input to the operation unit; and a geometric correction unit configured to perform an operation of projecting the input image on the effective element region.

According to an aspect of the present invention, a geometric correction adjustment method is a method for adjusting an effective element region in an element region in a projection apparatus, the projection apparatus including an output display element which has the element region including a plurality of pixels that modulate projection light and generates a projection image configured to be projected on a projection target object based on an input image by the quadrangular effective element region included in the element region, and projecting the projection image to the projection target object. The geometric correction adjustment method includes acquiring an adjustment instruction from a user to adjust the effective element region in the element region; and transforming the effective element region in the element region to shift a vertex of the effective element region along at least one side of two sides, each of the sides having one end that is the vertex to be shifted, according to the adjustment instruction.

According to an aspect of the present invention, a non-transitory computer readable storage medium storing codes causes a computer to perform geometric correction adjustment of adjusting an effective element region in an element region in a projection apparatus, the projection apparatus including an output display element which has the element region including a plurality of pixels that modulate projection light and generates a projection image configured to be projected on a projection target object based on an input image by the quadrangular effective element region included in the element region, and projecting the projection image to the projection target object. The medium stores codes for: acquiring an adjustment instruction from a user to adjust the effective element region in the element region; and transforming the effective element region in the element region to shift a vertex of the effective element region along at least one side of two sides, each of the sides having one end that is the vertex to be shifted, according to the adjustment instruction.

According to the present invention, a projection apparatus, a geometric correction adjustment method, and a computer readable storage medium storing codes for geometric correction adjustment for easy adjustment of geometric correction are provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4A is a flowchart illustrating an example of processing associated with adjustment of geometric correction;

DETAILED DESCRIPTION OF THE INVENTION

Figure 1:
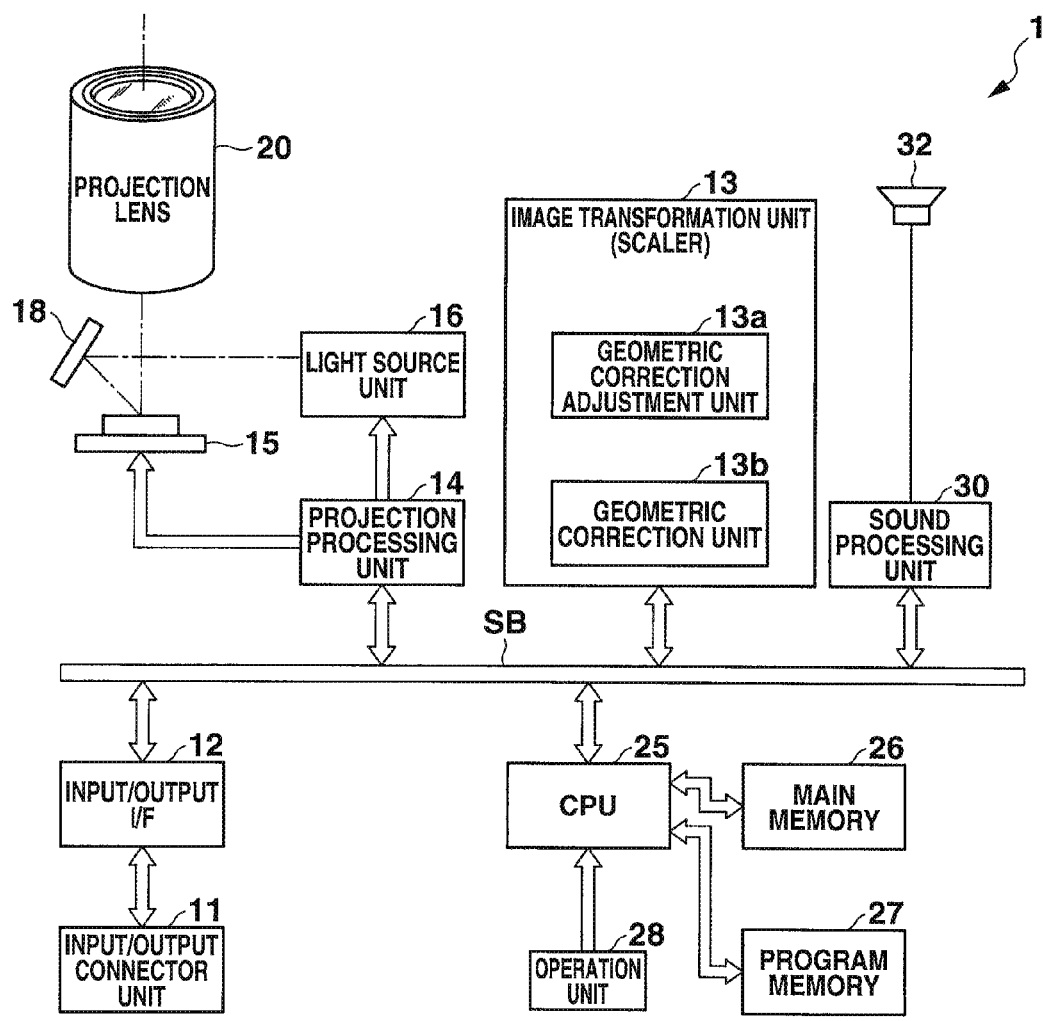
FIG. 1 is a block diagram illustrating a configuration example of a projector as a projection apparatus according to a first embodiment of the present invention.

An embodiment of the present invention will be described below with reference to the accompanying drawings. A projection apparatus according to the present embodiment employs a digital light processing (DLP) (registered trademark) using a micromirror display device. A schematic configuration of a projector 1 is illustrated in FIG. 1, as a projection apparatus according to the present embodiment. The projector 1 includes an input/output connector unit 11, an input/output interface (I/F) 12, an image transformation unit 13, a projection processing unit 14, a micromirror element 15, a light source unit 16, a mirror 18, a projection lens 20, a CPU 25, a main memory 26, a program memory 27, an operation unit 28, a sound processing unit 30, a speaker 32, and a system bus SB.

The input/output connector unit 11 includes, for example, a pin-jack (RCA) type video input terminal or a D-sub15 type RGB input terminal installed therein and receives an analog image signal. The received image signal is input to the image transformation unit 13 through the input/output I/F 12 and the system bus SB. The input analog image signal of any of various standards is converted to a digital image signal in the input/output I/F 12. The input/output connector unit 11 includes, for example, an HDMI (registered trademark) terminal installed therein, and may receive not only the analog image signal, but also a digital image signal. Also, the input/output connector unit 11 receives a sound signal by an analog signal or a digital signal. The received sound signal is input to the sound processing unit 30 through the input/output I/F 12 and the system bus SB.

The image transformation unit 13 may be called a scaler. The image transformation unit 13 performs conversion to adjust a resolution value, a gradation value or the like on input image data and generates image data having a predetermined format suitable for projection. The image transformation unit 13 includes a geometric correction adjustment unit 13a and a geometric correction unit 13b which receives an instruction from the geometric correction adjustment unit 13a and performs image correction, which are described below. The image transformation unit 13 transmits the image data that is converted by, for example, the image correction, to the projection processing unit 14. If required, the image transformation unit 13 transmits image data, on which symbols for on screen display (OSD) indicating various operational states of the projector 1 are superimposed, to the projection processing unit 14, as processed image data.

The light source unit 16 emits a plurality of color light beams including primary color light beams of red (R), green (G), and blue (B). The light source unit 16 is configured to sequentially emit the plurality of color light beams in a time division manner. Light emitted by the light source unit 16 is totally reflected by the mirror 18 and is incident on the micromirror element 15.

The micromirror element 15 includes a plurality of micromirrors arranged in an array form. The respective micromirrors are turned on/off at high speed to reflect the light irradiated from the light source unit 16 in a direction of the projection lens 20 or to deflect the light from a direction of the projection lens 20. In the micromirror element 15, the micromirrors are arranged in, for example, a wide extended graphic array (WXGA) (1,280 pixels×800 pixels). The micromirror element 15 forms an image having, for example, the WXGA resolution, by reflection of the respective micromirrors. That is, the micromirror element 15 functions as a spatial light modulation element. In the present embodiment, in the micromirror element 15, a region, in which a micromirror is arranged and which has a function of forming an image, is referred to as an element region.

The projection processing unit 14 operates the micromirror element 15 in order to display an image represented by the image data, according to the image data transmitted from the image transformation unit 13. That is, the projection processing unit 14 turns on/off the respective micromirrors of the micromirror element 15. The projection processing unit 14 drives the micromirror element 15 in a time division manner at high speed. The number of divisions of unit time is a number obtained by multiplying a frame rate according to a predetermined format, for example, 60 [frame/second], the number of divisions of color components, and the number of display gradations. Also, the projection processing unit 14 synchronizes operation of the light source unit 16 with operation of the light source unit 16 to control the operation of the light source unit 16. That is, the projection processing unit 14 performs time division on each frame, and controls the operation of the light source unit 16 to sequentially emit light beams of all color components for each frame.

The projection lens 20 adjusts the light guided from the micromirror element 15 to light to be projected on a projection target object, for example, a screen (not illustrated) or the like. Thus, an optical image formed by the light reflected by the micromirror element 15 is projected and displayed on a projection target object, such as a screen, through the projection lens 20. The projection lens 20 includes a zoom mechanism and has a function of changing a size of a projected image. Also, the projection lens 20 includes a focus adjustment mechanism for adjusting a focus of the projected image. In this way, the light source unit 16, the projection lens 20, and the like function as a projection optical system configured to project projection light on the projection target object.

The sound processing unit 30 includes a sound source circuit such as a PCM sound source. The sound processing unit 30 drives the speaker 32 to amplify and emit sound, based on analog sound data input from the input/output connector unit 11, or based on a signal obtained by converting, to analog signals, digital sound data provided upon projection operation. Also, the sound processing unit 30 generates a beep sound or the like if required. The speaker 32 is a general speaker that emits sound based on a signal input from the sound processing unit 30.

The CPU 25 controls operations of the image transformation unit 13, the projection processing unit 14, and the sound processing unit 30. The CPU 25 is connected to the main memory 26 and the program memory 27. The main memory 26 is configured by, for example, an SRAM. The main memory 26 functions as a work memory of the CPU 25. The program memory 27 is configured by an electrically rewritable non-volatile memory. The program memory 27 stores an operation program to be performed by the CPU 25, a variety of format data, or the like. Also, the CPU 25 is connected to the operation unit 28. The operation unit 28 includes a key operation unit which is installed in a body of the projector 1 and an infrared light receiving unit which receives infrared light from a remote control (not illustrated) dedicated to the projector 1. The operation unit 28 outputs a key operation signal to the CPU 25 based on a key operated by a user using the key operation unit of the body or the remote control. The CPU 25 controls operations of the respective units of the projector 1 in response to an instruction of the user from the operation unit 28, by using a program or data stored in the main memory 26 and the program memory 27. According to the present embodiment, the operation unit 28 includes, for example, a cross key, an OK button, or the like.

The geometric correction adjustment unit 13a of the image transformation unit 13 performs processing (processing illustrated in FIGS. 4A and 4B) according to geometric correction (distortion correction) so as to express an image projected by projection light emitted from the projection lens 20 on a projection target object, without distortion. Specifically, the geometric correction adjustment unit 13a adjusts an image transformation parameter associated with geometric correction that is performed by the geometric correction unit 13b of the image transformation unit 13, based on an adjustment instruction of the user that is input from the operation unit 28, upon adjustment of geometric correction before projection of the input image is started. The geometric correction adjustment unit 13a outputs the adjusted image transformation parameter to the geometric correction unit 13b of the image transformation unit 13.

A projection operation of the projector 1 according to the present embodiment will be described. The projection operation is performed by the projection processing unit 14 under the control of the CPU 25. The operation of the light source unit 16 is controlled by the projection processing unit 14. The projection processing unit 14 cause the light source unit 16 to sequentially emit three color light beams of, for example, a red light beam (R), a green light beam (G), and a blue light beam (B) by turning on/off respective color-emitting laser diodes or LEDs of the light source unit 16 or by changing a combination of light sources and phosphors. The projection processing unit 14 makes the red light beam, the green light beam, and the blue light beam incident on the micromirror element 15 from the light source unit 16 sequentially.

The micromirror element 15 is operated such that, as a gradation increases, a time required to guide the incident light to the projection lens 20 increases, and as a gradation decreases, a time required to guide the incident light to the projection lens 20 decreases, based on the image data for each micromirror (each pixel) in each color light beam. That is, the projection processing unit 14 controls the micromirror element 15 such that a micromirror corresponding to a high-gradation pixel is in an on state for a long time, and a micromirror corresponding to a low-gradation pixel is in an off state for a long time. Therefore, with respect to light emitted from the projection lens 20, a gradation of each color can be expressed for each micromirror (each pixel).

With respect to each frame, a color image is expressed by combining gradations, each of which is expressed by a turn-on time, for each color. In this way, projection light by which an image is expressed is projected from the projection lens 20. The projection light is projected on, for example, the screen and the color image is displayed on the screen or the like.

Although the projector using three colors of the red light beam, the green light beam, and the blue light beam has been taken as an example in the above description, a projector may be configured to form an image by combining light beams of complementary colors, such as magenta or yellow, and a white light beam and to emit light of such a color.

Next, geometric correction according to the present embodiment will be described. A region used for image display in the micromirror element 15 and a region of a projection image will be described with reference to FIGS. 2A to 3B.

Figure 2A:
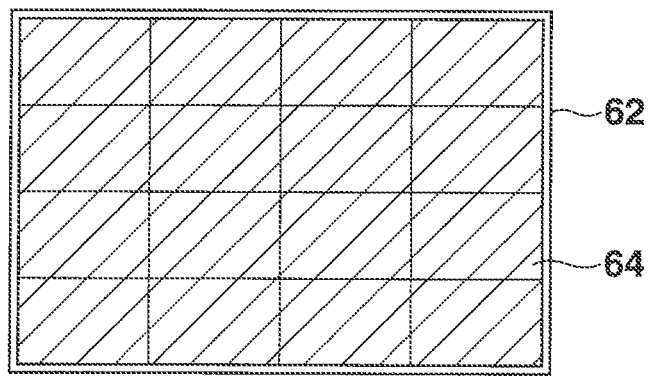
FIG. 2A is a view for explaining geometric correction and schematically illustrates an example of an element region and an effective element region of a micromirror element before geometric correction.

FIG. 2A is a view schematically illustrating the micromirror element 15. In FIG. 2A, a rectangle that is an outline schematically indicates an element region 62. The element region 62 is a region capable of expressing an image in which micromirrors are arranged in the micromirror element 15. Also, a hatched rectangle in FIG. 2A schematically indicates an effective element region 64. The effective element region 64 is a region used to realize an image transformed by the image transformation unit 13, in the element region 62. As described below, a region outside the effective element region 64 is image-processed, with a pixel gradation being set to 0 (black). FIG. 2A schematically illustrates a case where the entire element region 62 is used to express an image as the effective element region 64. Grids of the effective element region 64 are given for convenience such that an image distortion is easily recognized. That is, although the element region 62 is described as being identical to the effective element region in FIG. 2A, the element region 62 is illustrated as being slightly larger than the effective element region 64 for ease of understanding.

A case in which an object on which an image is projected by the projector 1 is a rectangular and flat screen is considered. In the present embodiment, a case in which an optical axis of the projection lens 20 of the projector 1 is not perpendicular to the screen is considered.

Figure 2B:
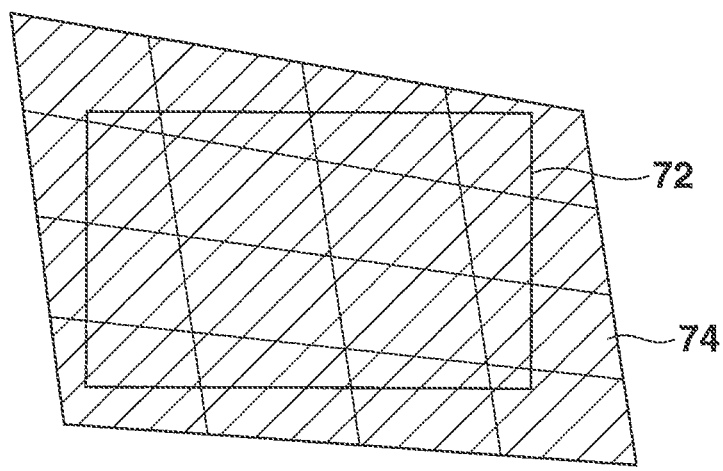
FIG. 2B is a view for explaining geometric correction and schematically illustrates an example of a projection target region and a projection region before geometric correction.

FIG. 2B schematically illustrates an appearance of a screen in the case where the entire element region 62 is used to express an image as the effective element region 64, as illustrated in FIG. 2A. In FIG. 2B, a rectangle illustrated at an inner side schematically represents a projection target region 72 that is a rectangular screen. In FIG. 2B, a hatched quadrangle represents a projection region 74 on which an image is projected by the projector 1. As illustrated in FIG. 2B, when an optical axis of the projection lens 20 is not perpendicular to the projection target region 72, the projection region 74 is a quadrangle, not a rectangle. Grids of the projection region 74 are given for convenience such that an image distortion is easily recognized. In the present embodiment, it is assumed that the projector 1 is disposed such that an outline of the projection region 74 is located outside the projection target region 72 (the projection region 74 includes the entire projection target region 72) as illustrated in FIG. 2B, and optical characteristics of the projection lens 20 (optical zoom setting or the like) are set.

As illustrated in FIG. 2B, when the optical axis of the projection lens 20 is not perpendicular to the projection target region 72, the projection region 74 is not a rectangle, and the projected image is distorted. In geometric correction, image expression using the micromirror element 15 is adjusted such that a rectangular image is projected on the projection target region 72 without distortion. That is, the image expressed on the element region 62 of the micromirror element 15 is a distorted image in which geometric correction is to be performed on an image to be projected, and consequently, adjustment is performed such that the image is projected on a projection target object without distortion. Specifically, geometric correction is performed such that a size of a projected image is appropriately reduced, and an image gradation is set to 0 (black) with respect to a region outside the reduced image (a region outside the effective element region 64 in the element region 62). The geometric correction is performed by the geometric correction unit 13b of the image transformation unit 13.

Figure 3A:
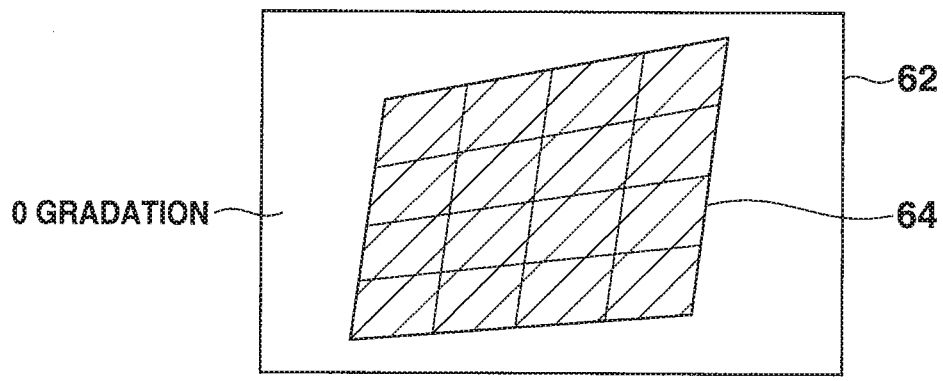
FIG. 3A is a view for explaining geometric correction and schematically illustrates an example of the element region and the effective element region of the micromirror element after geometric correction.

FIG. 3A schematically illustrates a relationship between the element region 62 and the effective element region 64 after geometric correction is performed by the geometric correction unit 13b of the image transformation unit 13. As illustrated in FIG. 3A, a distorted quadrangle in the element region is used for image expression as the effective element region 64. In practice, a projected image is appropriately reduced, and a region outside the effective element region 64 in the element region 62 is set to have an image gradation of 0 (black).

Figure 3B:
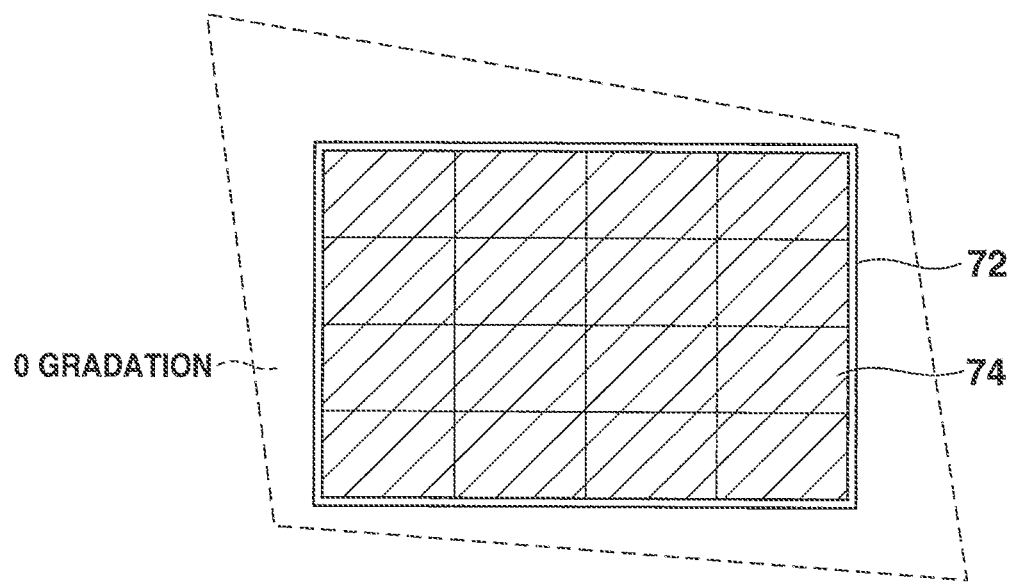
FIG. 3B is a view for explaining geometric correction and schematically illustrates an example of the projection target region and the projection region after geometric correction.

A relationship between the projection region 74 and the projection target region 72 of this case is schematically illustrated in FIG. 3B. As illustrated in FIG. 3B, the effective element region 64 as in FIG. 3A is set, and therefore, an image is projected on the projection target object without distortion. In practice, the image that is appropriately reduced in the effective element region 64 is projected to be placed within the projection region 74, and an image having a pixel gradation of 0 (black) is projected on a region portion (indicated by a dotted line) corresponding to the element region 62 outside the projection region 74. Adjusting the image in the element region 62 so as to project the image on the projection target object without distortion is referred to as geometric correction.

Therefore, for example, the micromirror element 15 has an element region including a plurality of pixels that modulate projection light, and functions as an output display element that generates a projection image which is projected on the projection target object based on an input image by a quadrangular effective element region included within the element region.

A method of setting an effective element region 64 required to project an image on a projection target object without distortion upon geometric correction according to the present embodiment will be described. A process associated with adjustment of geometric correction to be performed by the geometric correction adjustment unit 13a will be described with reference to flowcharts illustrated in FIGS. 4A and 4B.

Figure 5A:
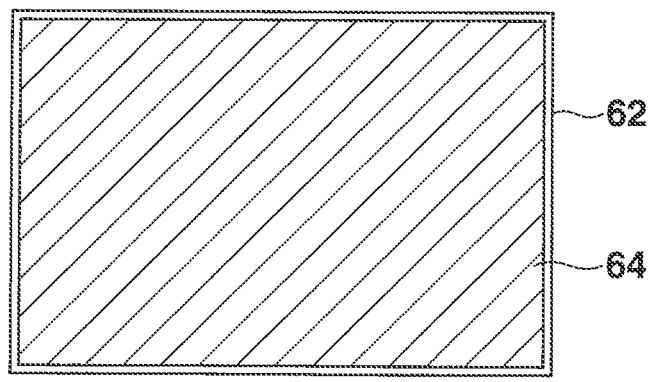
FIG. 5A is a schematic view illustrating an example of the element region and the effective element region of the micromirror element in an initial state.
Figure 5B:
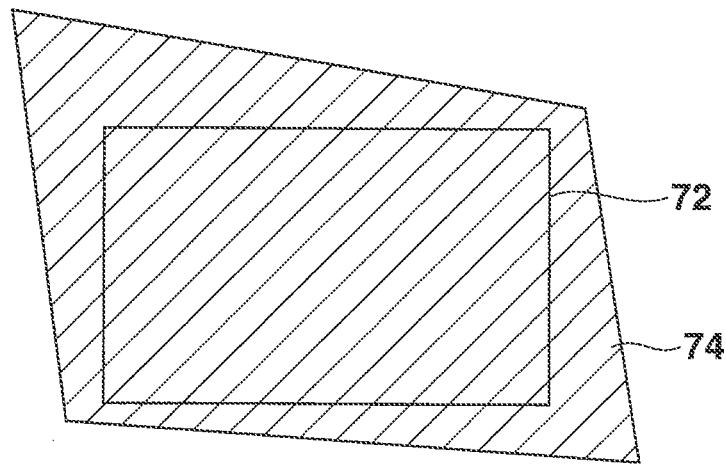
FIG. 5B is a schematic view illustrating an example of the projection target region and the projection region in the initial state.

In step S1, the geometric correction adjustment unit 13a instructs respective units of the projector 1 to project a chart for geometric correction on a projection target object. The chart for geometric correction may have any form, but it is preferable that an outline of a projection image is included in the chart for geometric correction. In the present embodiment, for simplicity, a description is given on the assumption that the chart for geometric correction is an outline. In an initial state, as illustrated in FIG. 5A, the whole of the element region 62 of the micromirror element 15 is used as the effective element region 64 in order to express a projection image. As illustrated in FIG. 5B, in this state, the user installs the projector 1 to adjust a distance of the projector 1 to a screen, and adjusts a focal distance, a focus, or the like of the projection lens 20 such that the projection region 74 is wider than the projection target region 72 of the projection target object that is, for example, a screen. When installing the projector 1 and performing adjustment for the focal distance and focus of the projection lens 20, the user inputs an instruction to start adjustment of geometric correction to the projector 1. The input is achieved, for example, when the user presses a button included on the operation unit 28 to start adjustment of geometric correction.

In step S2, the geometric correction adjustment unit 13a determines whether a user inputs an instruction to start adjustment of geometric correction. When it is determined that the instruction to start adjustment is not input, the processing returns to step S2 and waits for an input of the instruction to start adjustment. When it is determined that the instruction to start adjustment is input, the processing proceeds to step S3.

[Horizontal-Direction Adjustment Processing of Upper Left Vertex]

Figure 6A:
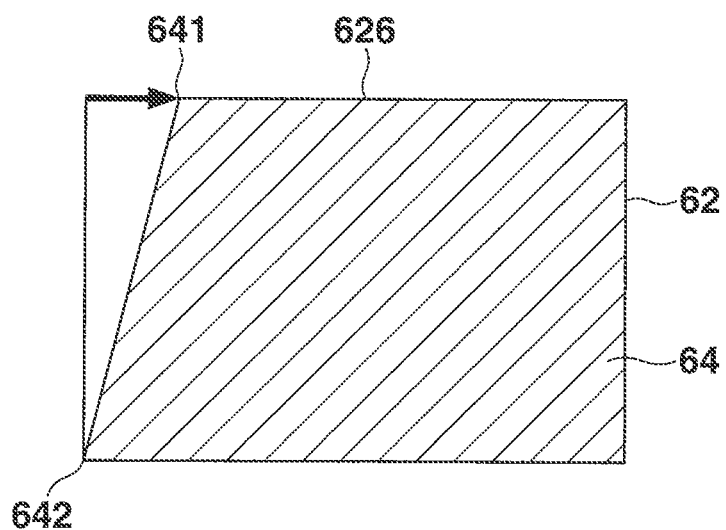
FIG. 6A is a view for explaining horizontal-direction adjustment processing of an upper left vertex and illustrates an example of the element region and the effective element region of the micromirror element.
Figure 6B:
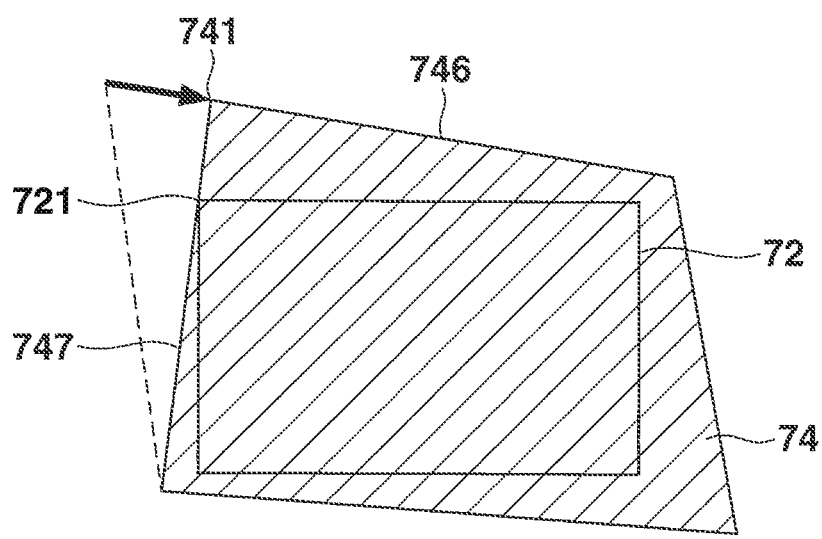
FIG. 6B is a view for explaining the horizontal-direction adjustment processing of the upper left vertex and illustrates an example of the projection target region and the projection region.

In step S3, the geometric correction adjustment unit 13a starts horizontal-direction adjustment processing of an upper left vertex. In the horizontal-direction adjustment processing of the upper left vertex, a user presses, for example, a left button or right button of a cross key of the operation unit 28. In response to an input using the left/right button, the geometric correction adjustment unit 13a performs adjustment of image transformation that is performed by the geometric correction unit 13b on an image represented by using the micromirror element 15. That is, when the user presses the right button, the geometric correction adjustment unit 13a shifts an upper left corner 641 of the effective element region 64 to the right along an upper side 626 of the element region 62 to transform the effective element region 64 to have a trapezoid shape, as illustrated in FIG. 6A. In this case, as illustrated in FIG. 6B, in the projected image, an upper left corner 741 of the projection region 74 is shifted to the right along an upper side 746 of the projection region 74 and the shape of the projection region 74 is changed. Conversely, when the user presses the left button, the effective element region 64 is adjusted such that the upper left corner 741 of the projection region 74 is shifted to the left along the upper side 746 of the projection region 74.

The user operates the left/right button of the operation unit 28 such that a left side 747 of the projection region 74 comes into contact with an upper left corner 721 of the projection target region 72. While checking the projection region 74, the user presses the OK button of the operation unit 28 when the left side 747 of the projection region 74 comes into contact with the upper left corner 721 of the projection target region 72. When the OK button of the operation unit 28 is pressed, the horizontal-direction adjustment processing of the upper left vertex is ended. Subsequently, the processing proceeds to step S4.

[Vertical-Direction Adjustment Processing of Upper Left Vertex]

Figure 7A:
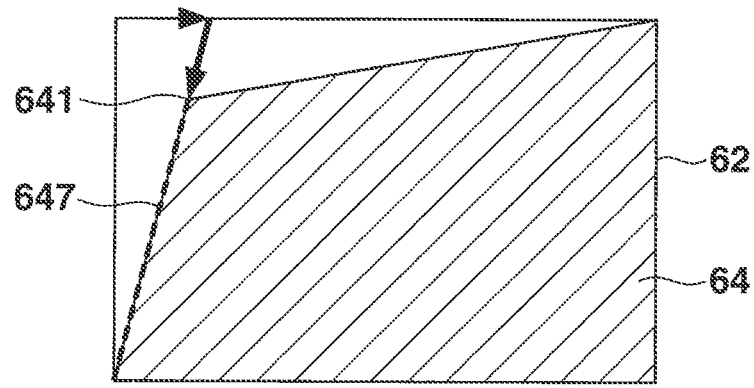
FIG. 7A is a view for explaining the vertical-direction adjustment processing of the upper left vertex and illustrates an example of the element region and the effective element region of the micromirror element.
Figure 7B:
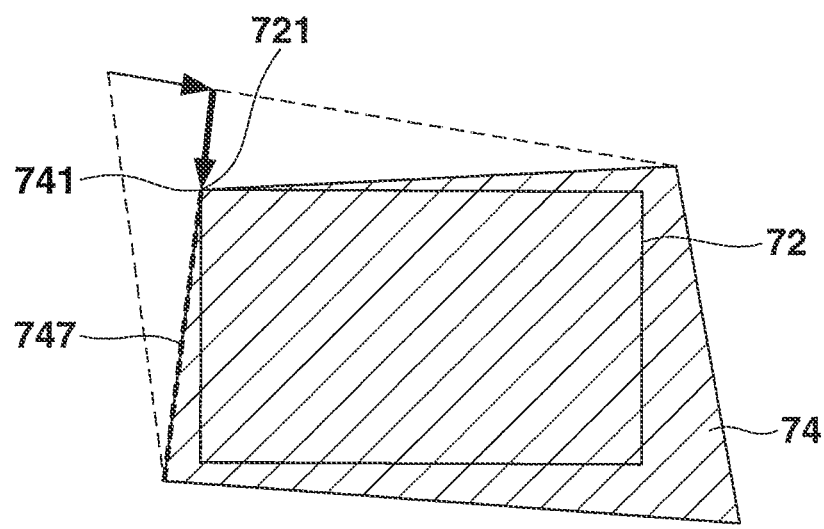
FIG. 7B is a view for explaining the vertical-direction adjustment processing of the upper left vertex and illustrates an example of the projection target region and the projection region.

In step S4, the geometric correction adjustment unit 13a starts vertical-direction adjustment processing of the upper left vertex. In the vertical-direction adjustment processing of the upper left vertex, the user presses, for example, the up button or down button of the cross key of the operation unit 28. In response to an input using the up/down button, the geometric correction adjustment unit 13a performs adjustment of image transformation that is performed by the geometric correction unit 13b on an image represented by using the micromirror element 15. That is, when the user presses the down button, the geometric correction adjustment unit 13a shifts the upper left corner 641 of the effective element region 64 downward along the left side 647 of the effective element region 64 to transform the effective element region 64, as illustrated in FIG. 7A. In this case, as illustrated in FIG. 7B, in the projected image, the upper left corner 741 of the projection region 74 is shifted downward along the left side 747 of the projection region 74 and the shape of the projection region 74 is changed. Conversely, when the user presses the up button, the effective element region 64 is adjusted such that the upper left corner 741 of the projection region 74 is shifted upward along the left side 747 of the projection region 74.

The user operates the up/down button of the operation unit 28 such that the upper left corner 741 of the projection region 74 is matched with the upper left corner 721 of the projection target region 72. While checking the projection region 74, the user presses the OK button of the operation unit 28 when the upper left corner 741 of the projection region 74 is matched with the upper left corner 721 of the projection target region 72. When the OK button of the operation unit 28 is pressed, the vertical-direction adjustment processing of an upper left vertex is ended.

Figure 4B:
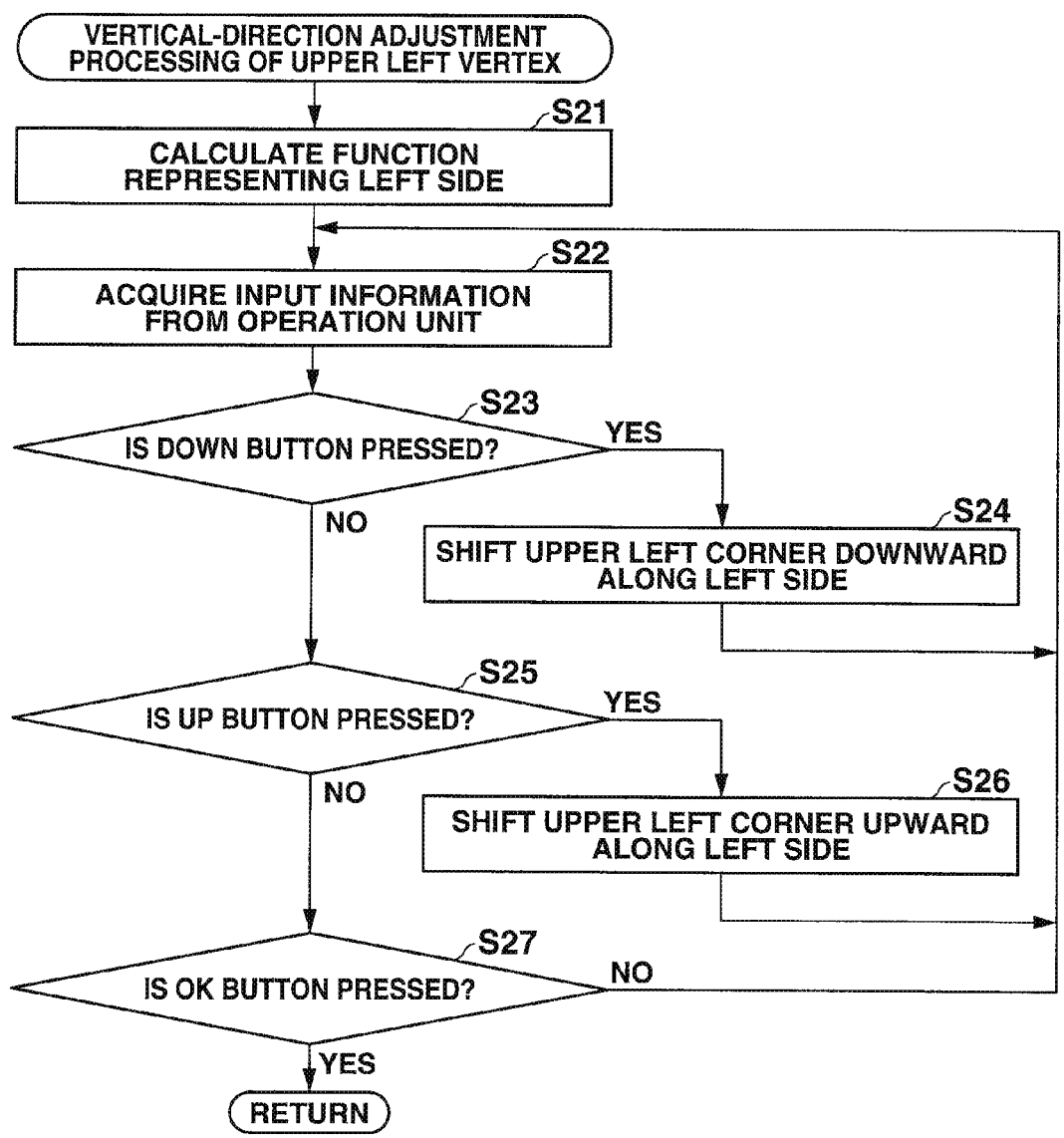
FIG. 4B is a flowchart illustrating an example of vertical-direction adjustment processing of an upper left vertex associated with adjustment of geometric correction.

The vertical-direction adjustment processing of the upper left vertex (step S4) will be described in detail with reference to a flowchart of FIG. 4B.

In step S21, the geometric correction adjustment unit 13a calculates a function representing the left side 647 of the effective element region 64. Specifically, a function of a straight line passing through the upper left corner 641 and the lower left corner 642 in FIG. 6A is acquired. In step S22, the geometric correction adjustment unit 13a acquires an instruction of the user which is input to the operation unit 28.

In step S23, the geometric correction adjustment unit 13a determines whether an input of the user acquired in step S22 is a press on the down button. When there is a press on the down button, the processing proceeds to step S24. In step S24, the geometric correction adjustment unit 13a performs an operation of shifting the upper left corner 641 of the effective element region 64 downward along the left side 647 calculated in step S21 and re-determines the effective element region 64. The geometric correction adjustment unit 13a transmits information of the re-determined effective element region 64 to the geometric correction unit 13b. The geometric correction unit 13b performs geometric correction based on the information acquired from the geometric correction adjustment unit 13a, and allows an image after the geometric correction to be projected on the projection target object. Thereafter, the processing returns to step S22. (In this case, the function of a straight line obtained in step S21 is not changed even when the upper left corner 641 is shifted). On the other hand, when it is determined in step S23 that the input of the user is not a press on the down button, the processing proceeds to step S25.

In step S25, the geometric correction adjustment unit 13a determines whether the input of the user acquired in step S22 is a press on the up button. When there is a press on the up button, the processing proceeds to step S26. In step S26, the geometric correction adjustment unit 13a performs an operation of shifting the upper left corner 641 of the effective element region 64 upward along the left side 647 calculated in step S21 and re-determines the effective element region 64. The geometric correction adjustment unit 13a transmits information of the re-determined effective element region 64 to the geometric correction unit 13b. The geometric correction unit 13b performs geometric correction based on the information acquired from the geometric correction adjustment unit 13a, and allows an image after the geometric correction to be projected on the projection target object. Thereafter, the processing returns to step S22. On the other hand, when it is determined in step S23 that the input of the user is not a press on the up button, the processing proceeds to step S27.

In step S27, the geometric correction adjustment unit 13a determines whether the input of the user acquired in step S22 is a press on the OK button. When there is not a press on the OK button, the processing returns to step S22. When it is determined that there is a press on the OK button, the processing escapes from the processing in step S4 of FIG. 4A and returns to the processing in step S5.

[Horizontal-Direction Adjustment Processing of Lower Left Vertex]

Figure 8A:
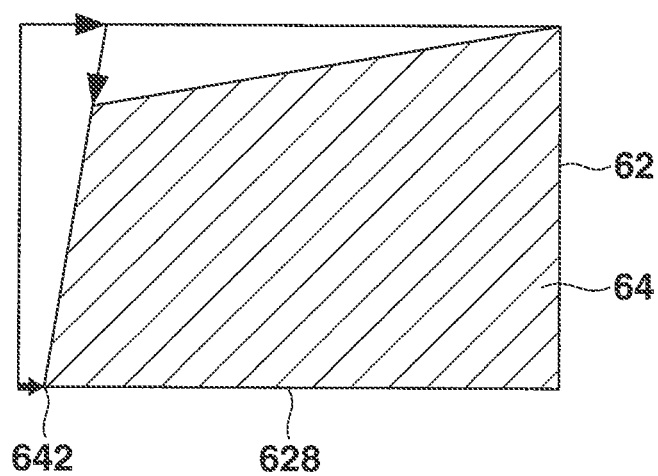
FIG. 8A is a view for explaining horizontal-direction adjustment processing of a lower left vertex and illustrates an example of the element region and the effective element region of the micromirror element.
Figure 8B:
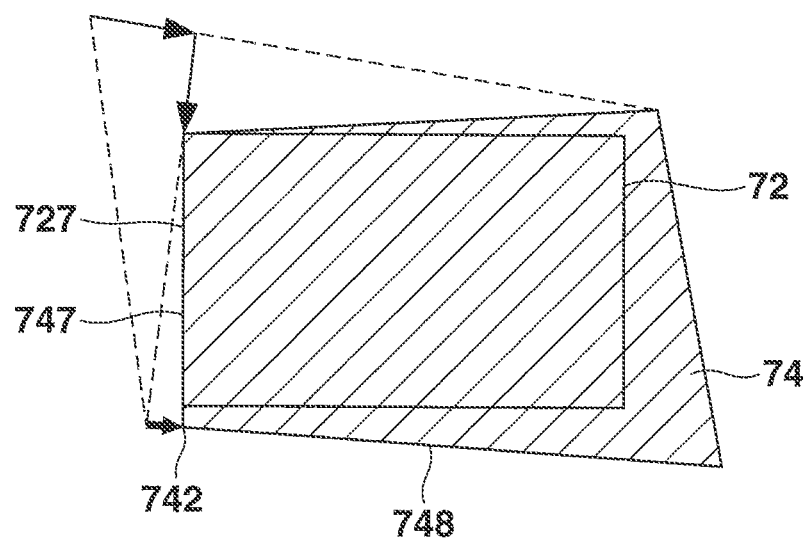
FIG. 8B is a view for explaining the horizontal-direction adjustment processing of the lower left vertex and illustrates an example of the projection target region and the projection region.

The description is continued returning to FIG. 4A. In step S5, the geometric correction adjustment unit 13a starts horizontal-direction adjustment processing of a lower left vertex. In the horizontal-direction adjustment processing of the lower left vertex, a user presses, for example, the left button or right button of the cross key of the operation unit 28. In response to an input using the left/right button, the geometric correction adjustment unit 13a performs adjustment of image transformation that is performed by the geometric correction unit 13b on an image represented by using the micromirror element 15. That is, when the user presses the right button, the geometric correction adjustment unit 13a shifts a lower left corner 642 of the effective element region 64 along a lower side 628 of the element region 62 to the right as illustrated in FIG. 8A to transform the effective element region 64. In this case, as illustrated in FIG. 8B, in the projected image, a lower left corner 742 of the projection region 74 is shifted to the right along a lower side 748 of the projection region 74, and therefore, the shape of the projection region 74 is changed. Conversely, when the user presses the left button, the effective element region 64 is adjusted such that the lower left corner 742 of the projection region 74 is shifted to the left along the lower side 748 of the projection region 74.

The user operates the left/right button of the operation unit 28 such that the left side 747 of the projection region 74 overlaps a left side 727 of the projection target region 72. While checking the projection region 74, the user presses the OK button of the operation unit 28 when the left side 747 of the projection region 74 comes into contact with the left side 727 of the projection target region 72. When the OK button of the operation unit 28 is pressed, the horizontal-direction adjustment processing of a lower left vertex is ended. Subsequently, the processing proceeds to step S6.

[Vertical-Direction Adjustment Processing of Lower Left Vertex]

Figure 9A:
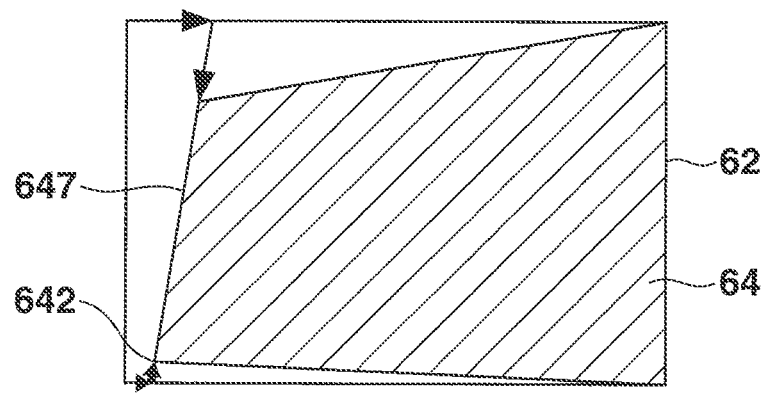
FIG. 9A is a view for explaining the vertical-direction adjustment processing of the lower left vertex and illustrates an example of the element region and the effective element region of the micromirror element.
Figure 9B:
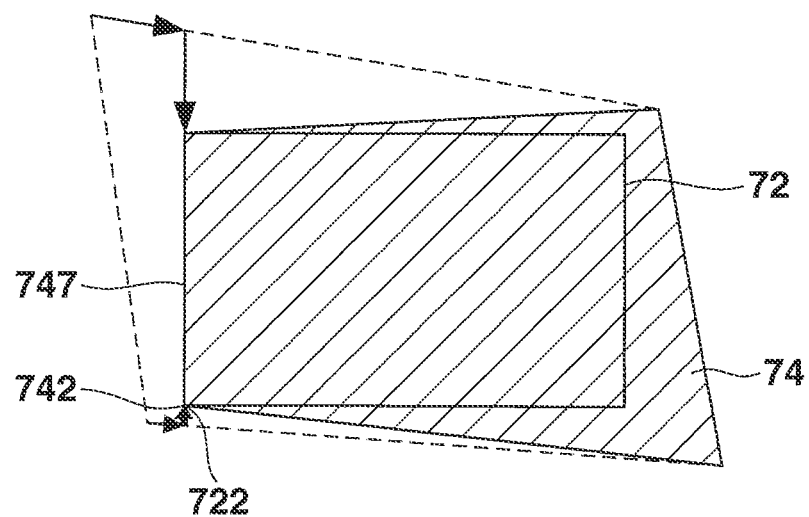
FIG. 9B is a view for explaining the vertical-direction adjustment processing of the lower left vertex and illustrates an example of the projection target region and the projection region.

In step S6, the geometric correction adjustment unit 13a starts vertical-direction adjustment processing of the lower left vertex. In the vertical-direction adjustment processing of the lower left vertex, the user presses, for example, the up button or down button of the cross key of the operation unit 28. In response to an input using the up/down button, the geometric correction adjustment unit 13a performs adjustment of image transformation that is performed by the geometric correction unit 13b on an image represented by using the micromirror element 15. That is, when the user presses the up button, the geometric correction adjustment unit 13a shifts the lower left corner 642 of the effective element region 64 upward along the left side 647 of the effective element region 64 to transform the effective element region 64, as illustrated in FIG. 9A. In this case, as illustrated in FIG. 9B, in the projected image, the lower left corner 742 of the projection region 74 is shifted upward along the left side 747 of the projection region 74, and therefore, the shape of the projection region 74 is changed. Conversely, when the user presses the down button, the effective element region 64 is adjusted such that the lower left corner 742 of the projection region 74 is shifted downward along the left side 747 of the projection region 74.

The user operates the up/down button of the operation unit 28 such that the lower left corner 742 of the projection region 74 is matched with a lower left corner 722 of the projection target region 72. While checking the projection region 74, the user presses the OK button of the operation unit 28 when the lower left corner 742 of the projection region 74 is matched with the lower left corner 722 of the projection target region 72. When the OK button of the operation unit 28 is pressed, the vertical-direction adjustment processing of a lower left vertex is ended.

Subsequently, the processing proceeds to step S7. In this manner, the vertical-direction adjustment processing of the lower left vertex is similar to the vertical-direction adjustment processing of the upper left vertex (step S4) which has been described with reference to FIG. 4B.

[Horizontal-Direction Adjustment Processing of Lower Right Vertex]

Figure 10A:
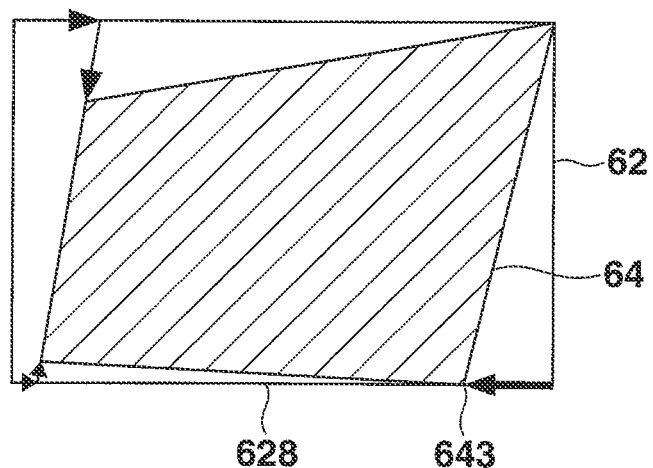
FIG. 10A is a view for explaining horizontal-direction adjustment processing of a lower right vertex and illustrates an example of the element region and the effective element region of the micromirror element.
Figure 10B:
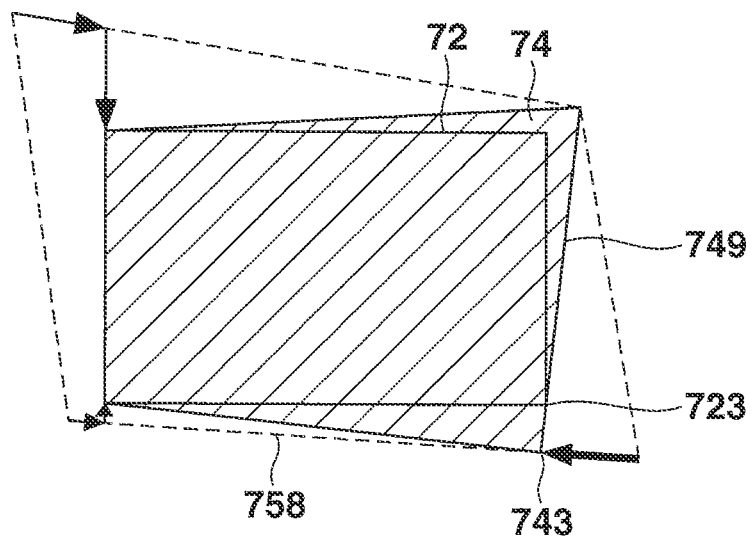
FIG. 10B is a view for explaining the horizontal-direction adjustment processing of the lower right vertex and illustrates an example of the projection target region and the projection region.

In step S7, the geometric correction adjustment unit 13a starts horizontal-direction adjustment processing of a lower right vertex. In the horizontal-direction adjustment processing of the lower right vertex, a user presses, for example, the left button or right button of the cross key of the operation unit 28. In response to an input using the left/right button, the geometric correction adjustment unit 13a performs adjustment of image transformation that is performed by the geometric correction unit 13b on an image represented by using the micromirror element 15. That is, when the user presses the left button, the geometric correction adjustment unit 13a shifts a lower right corner 643 of the effective element region 64 to the left along the lower side 628 of the element region 62 as illustrated in FIG. 10A to transform the effective element region 64. In this case, as illustrated in FIG. 10B, in the projected image, a lower right corner 743 of the projection region 74 is shifted to the left along a lower side 758 of the projection region 74 before transformation and therefore, the shape of the projection region 74 is changed. Conversely, when the user presses the right button, the effective element region 64 is adjusted such that the lower right corner 743 of the projection region 74 is shifted to the right along the lower side 758 of the projection region 74 before transformation.

The user operates the left/right button of the operation unit 28 such that a right side 749 of the projection region 74 comes into contact with a lower right corner 723 of the projection target region 72. While checking the projection region 74, the user presses the OK button of the operation unit 28 when the right side 749 of the projection region 74 comes into contact with the lower right corner 723 of the projection target region 72. When the OK button of the operation unit 28 is pressed, the horizontal-direction adjustment processing of the lower right vertex is ended. Subsequently, the processing proceeds to step S8.

[Vertical-Direction Adjustment Processing of Lower Right Vertex]

Figure 11A:
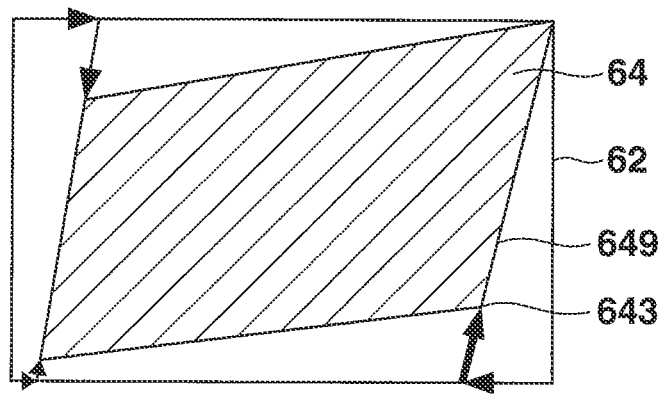
FIG. 11A is a view for explaining the vertical-direction adjustment processing of the lower right vertex and illustrates an example of the element region and the effective element region of the micromirror element.
Figure 11B:
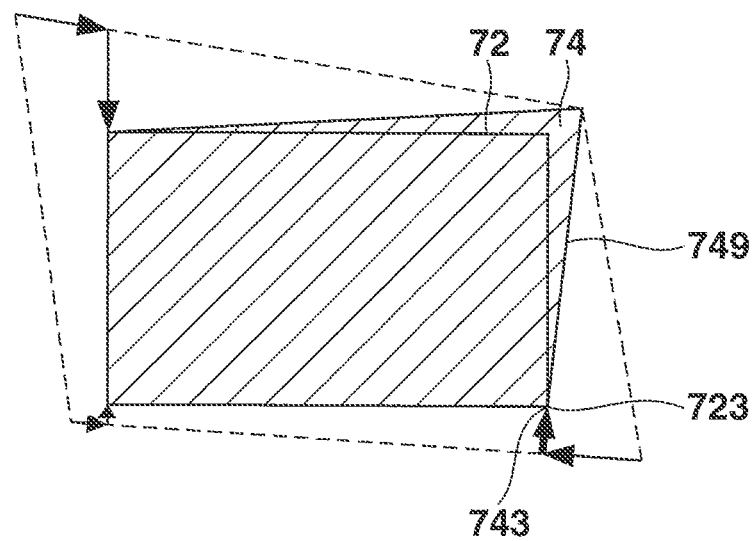
FIG. 11B is a view for explaining the vertical-direction adjustment processing of the lower right vertex and illustrates an example of the projection target region and the projection region.

In step S8, the geometric correction adjustment unit 13a starts vertical-direction adjustment processing of the lower right vertex. In the vertical-direction adjustment processing of the lower right vertex, the user presses, for example, the up button or down button of the cross key of the operation unit 28. In response to an input using the up/down button, the geometric correction adjustment unit 13a performs adjustment of image transformation that is performed by the geometric correction unit 13b on an image represented by using the micromirror element 15. That is, when the user presses the up button, the geometric correction adjustment unit 13a shifts a lower right corner 643 of the effective element region 64 upward along a right side 649 of the effective element region 64 to transform the effective element region 64, as illustrated in FIG. 11A. In this case, as illustrated in FIG. 11B, in the projected image, the lower right corner 743 of the projection region 74 is shifted upward along the right side 749 of the projection region 74, and therefore, the shape of the projection region 74 is changed. Conversely, when the user presses the down button, the effective element region 64 is adjusted such that the lower right corner 743 of the projection region 74 is shifted downward along the right side 749 of the projection region 74.

The user operates the up/down button of the operation unit 28 such that the lower right corner 743 of the projection region 74 is matched with the lower right corner 723 of the projection target region 72. While checking the projection region 74, the user presses the OK button of the operation unit 28 when the lower right corner 743 of the projection region 74 is matched with the lower right corner 723 of the projection target region 72. When the OK button of the operation unit 28 is pressed, the vertical-direction adjustment processing of a lower right vertex is ended. Subsequently, the processing proceeds to step S9. In this manner, the vertical-direction adjustment processing of a lower right vertex is similar to the vertical-direction adjustment processing of an upper left vertex (step S4) which has been described with reference to FIG. 4B.

[Horizontal-Direction Adjustment Processing of Upper Right Vertex]

Figure 12A:
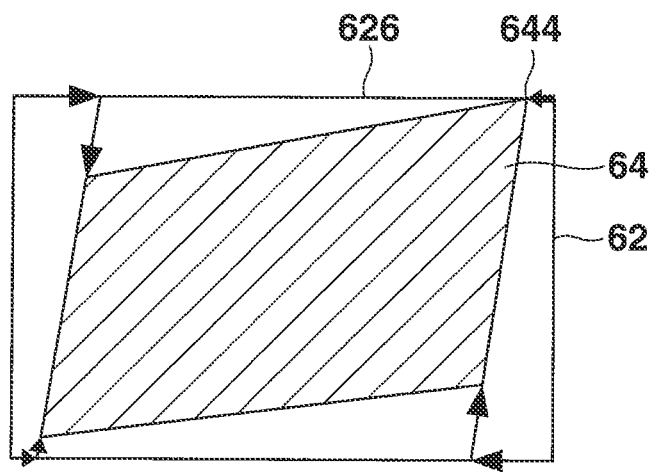
FIG. 12A is a view for explaining horizontal-direction adjustment processing of an upper right vertex and illustrates an example of the element region and the effective element region of the micromirror element.
Figure 12B:
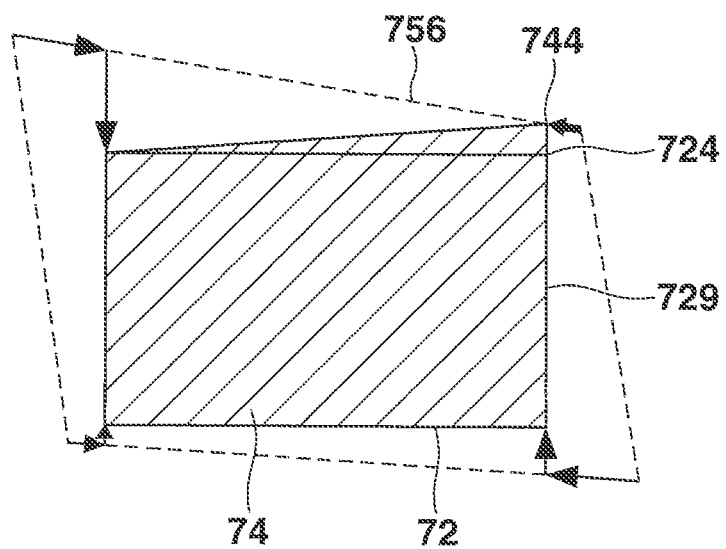
FIG. 12B is a view for explaining the horizontal-direction adjustment processing of the upper right vertex and illustrates an example of the projection target region and the projection region.

In step S9, the geometric correction adjustment unit 13a starts horizontal-direction adjustment processing of an upper right vertex. In the horizontal-direction adjustment processing of the upper right vertex, a user presses, for example, the left button or right button of the cross key of the operation unit 28. In response to an input using the left/right button, the geometric correction adjustment unit 13a performs adjustment of image transformation that is performed by the geometric correction unit 13b on an image represented by using the micromirror element 15. That is, as illustrated in FIG. 12A, when the user presses the left button, the geometric correction adjustment unit 13a shifts an upper right corner 644 of the effective element region 64 to the left along the upper side 626 of the element region 62 to transform the effective element region 64. In this case, as illustrated in FIG. 12B, in the projected image, an upper right corner 744 of the projection region 74 is shifted to the left along an upper side 756 of the projection region 74 before transformation, and therefore, the shape of the projection region 74 is changed. Conversely, when the user presses the right button, the effective element region 64 is adjusted such that the upper right corner 744 of the projection region 74 is shifted to the right along the upper side 756 of the projection region 74 before transformation.

The user operates the left/right button of the operation unit 28 such that the right side 749 of the projection region 74 overlaps a right side 729 of the projection target region 72. While checking the projection region 74, the user presses the OK button of the operation unit 28 when the right side 749 of the projection region 74 comes into contact with the right side 729 of the projection target region 72. When the OK button of the operation unit 28 is pressed, the horizontal-direction adjustment processing of the upper-right vertex is ended. Subsequently, the processing proceeds to step S10.

[Vertical-Direction Adjustment Processing of Upper Right Vertex]

Figure 13A:
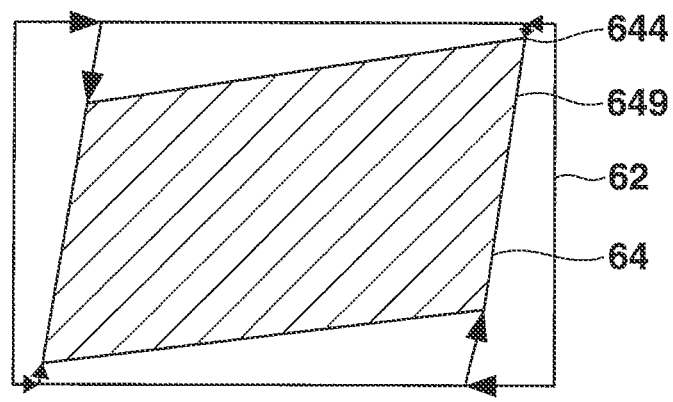
FIG. 13A is a view for explaining the vertical-direction adjustment processing of the upper right vertex and illustrates an example of the element region and the effective element region of the micromirror element.
Figure 13B:
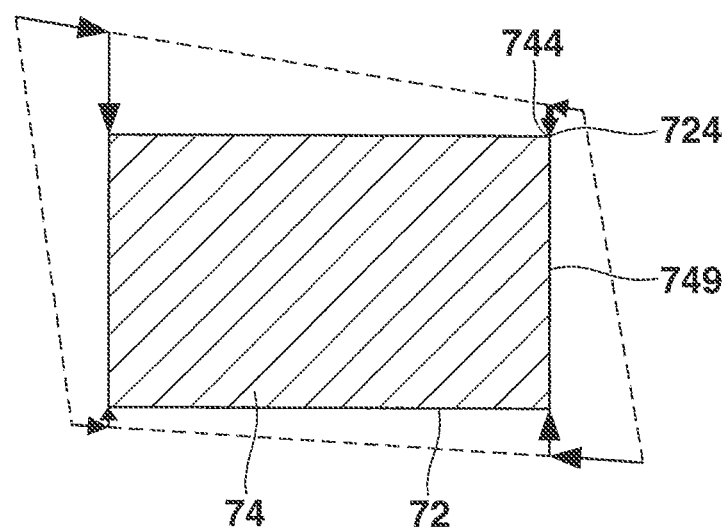
FIG. 13B is a view for explaining the vertical-direction adjustment processing of the upper right vertex and illustrates an example of the projection target region and the projection region.

In step S10, the geometric correction adjustment unit 13a starts vertical-direction adjustment processing of the upper right vertex. In the vertical-direction adjustment processing of the upper right vertex, the user presses, for example, the up button or down button of the cross key of the operation unit 28. In response to an input using the up/down button, the geometric correction adjustment unit 13a performs adjustment of image transformation that is performed by the geometric correction unit 13b on an image represented by using the micromirror element 15. That is, as illustrated in FIG. 13A, when the user presses the down button, the geometric correction adjustment unit 13a shifts an upper right corner 644 of the effective element region 64 downward along a right side 649 of the effective element region 64 to transform the effective element region 64. In this case, as illustrated in FIG. 13B, in the projected image, the upper right corner 744 of the projection region 74 is shifted downward along the right side 749 of the projection region 74, and therefore, the shape of the projection region 74 is changed. Conversely, when the user presses the down button, the effective element region 64 is adjusted such that the upper right corner 744 of the projection region 74 is shifted downward along the right side 749 of the projection region 74.

The user operates the up/down button of the operation unit 28 such that the upper right corner 744 of the projection region 74 is matched with the upper right corner 724 of the projection target region 72. While checking the projection region 74, the user presses the OK button of the operation unit 28 when the upper right corner 744 of the projection region 74 is matched with the upper right corner 724 of the projection target region 72. When the OK button of the operation unit 28 is pressed, the vertical-direction adjustment processing of an upper light vertex is ended.

Subsequently, the processing is ended. In this manner, the vertical-direction adjustment processing of the upper right vertex is similar to the vertical-direction adjustment processing of the upper left vertex (step S4) which has been described with reference to FIG. 4B.

According to the above-described geometric correction adjustment processing, an image transformation formula required to match the projection region 74 with the rectangular projection target region 72 is obtained. The projector 1 according to the present embodiment stores the image transformation formula obtained as described above. The image transformation unit 13 performs image transformation using the image transformation formula upon image projection. Consequently, an image can be projected on a projection target object without distortion.

[Comparative Example]

There has been known a projector having a function of performing setting of geometric correction for projecting an image on a projection target object without distortion while shifting a vertex of a projection region by using, for example, a cross key. In such setting of geometric correction, in general, a vertex of an effective element region is shifted in parallel to an side of an element region of the micromirror element 15 in response to an input through the cross key. That is, after the horizontal-direction adjustment processing of an upper left vertex as described with reference to FIGS. 6A and 6B, the following operation is performed on processing corresponding to the vertical-direction adjustment processing of the upper left vertex as described with reference to FIGS. 7A and 7B.

Figure 14A:
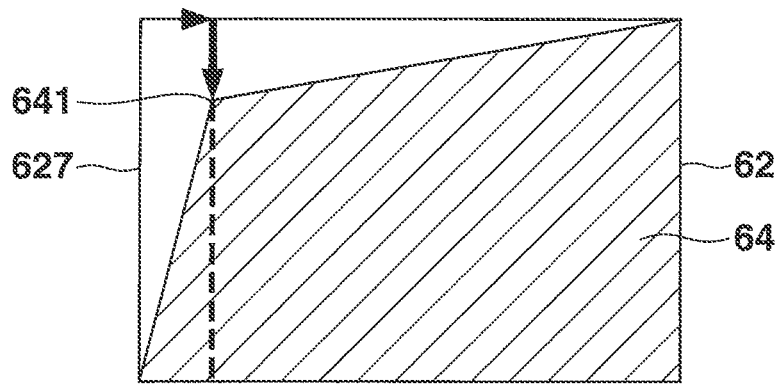
FIG. 14A is a view for explaining a comparative example corresponding to the vertical-direction adjustment processing of the upper left vertex and illustrates an example of the element region and the effective element region of the micromirror element.
Figure 14B:
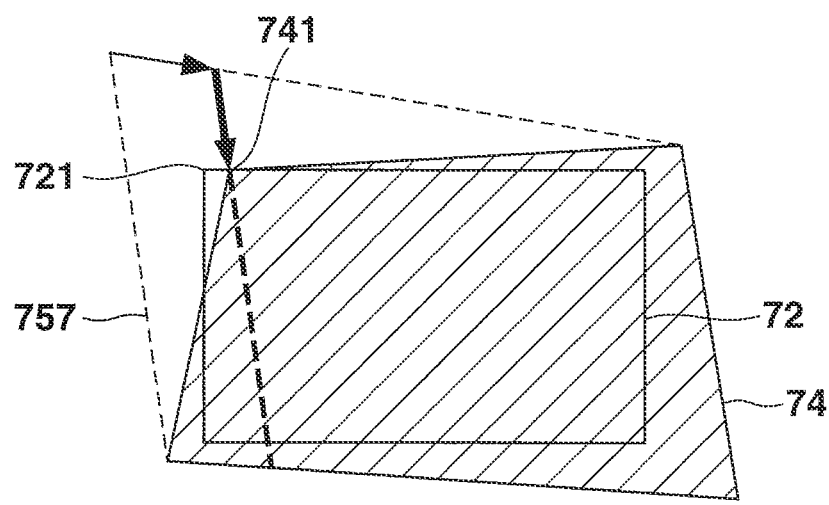
FIG. 14B is a view for explaining the comparative example corresponding to the vertical-direction adjustment processing of the upper left vertex and illustrates an example of the projection target region and the projection region.

In the vertical-direction adjustment processing of the upper left vertex, the user presses, for example, the up button or down button of the cross key of the operation unit 28. That is, when the user presses the down button, as illustrated in FIG. 14A, the effective element region is transformed such that the upper left corner 641 of the effective element region 64 is shifted downward in parallel with the left side 627 of the element region 62. In this case, as illustrated in FIG. 14B, in the projected image, the upper left corner 741 of the projection region 74 is shifted downward in parallel with the left side 757 of the projection region 74 before transformation, and therefore, the shape of the projection region 74 is transformed. As a result, the upper left corner 741 of the projection region 74 is not matched with the upper left corner 721 of the projection target region 72. Thus, the user repeatedly performs adjustment through the left/right button and adjustment through the up/down button in order to match the upper left corner 741 of the projection region 74 with the upper left corner 721 of the projection target region 72. It is inconvenient to repeatedly perform adjustment through the left/right button and adjustment through the up/down button.

According to the embodiment of the present invention, adjustment is easily performed in, for example, step S4, as compared with the above-described general adjustment method. That is, when the user presses the down button, as illustrated in FIG. 7A, the upper left corner 641 of the effective element region 64 is shifted downward along the left side 647 of the effective element region 64. Thus, as illustrated in FIG. 7B, the upper left corner 741 of the projection region 74 is directly shifted in a straight line toward the upper left corner 721 of the projection target region 72 along the left side 747 of the projection region 74. Consequently, the user can match the upper left corner 741 of the projection region 74 with the upper left corner 721 of the projection target region 72 by a single operation. In this way, the user easily performs adjustment according to the present embodiment.

As describe above, the effective element region 64 in the element region 62 is transformed so as to shift a vertex of the effective element region 64 along an side, an end of which is the vertex, according to the adjustment instruction input to the operation unit 28, thereby making it possible for the user to easily perform adjustment for geometric correction.

[Modification]

The above described embodiment represents examples in which, upon horizontal-direction adjustment processing of respective vertexes, the respective vertexes of the effective element region 64 are shifted along the upper side 626 or the lower side 628 of the element region 62. There is no limitation thereto, and a configuration may be made such that the respective vertexes of the effective element region 64 are shifted along the upper side 646 or the lower side 648 of the effective element region 64.

Figure 15A:
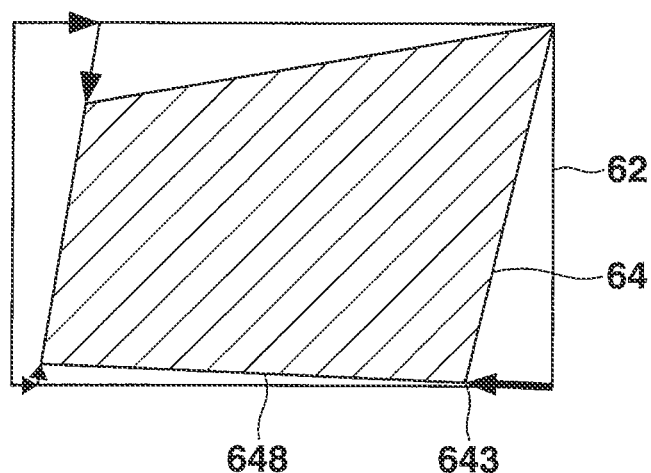
FIG. 15A is a view for explaining horizontal-direction adjustment processing of a lower right vertex according to a modification example and illustrates an example of the element region and the effective element region of the micromirror element.
Figure 15B:
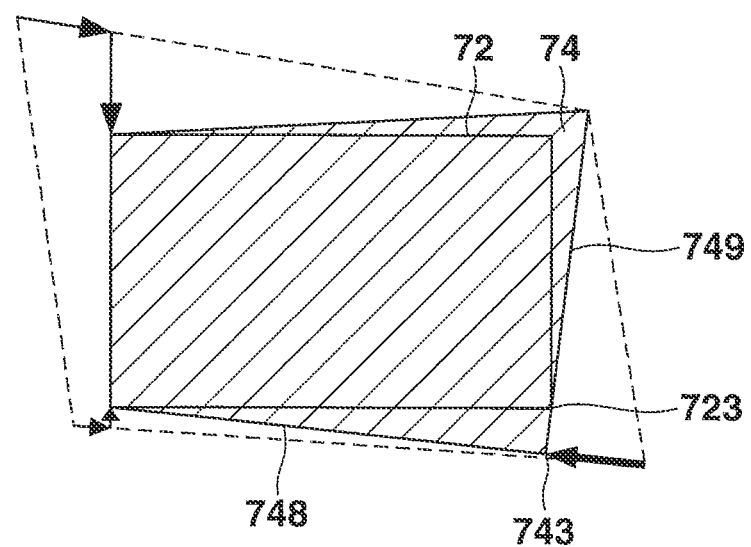
FIG. 15B is a view for explaining the horizontal-direction adjustment processing of the lower right vertex according to the modification example and illustrates an example of the projection target region and the projection region.

For example, the horizontal-direction adjustment processing of the lower right vertex in step S7 as described with reference to FIGS. 10A and 10B is performed as follows. That is, when the user presses the left button, as illustrated in FIG. 15A, the geometric correction adjustment unit 13a shifts the lower right corner 643 of the effective element region 64 to the left along the lower side 648 of the effective element region 64 to transform the effective element region 64. In this case, as illustrated in FIG. 15B, in the projected image, the lower right corner 743 of the projection region 74 is shifted to the left along the lower side 748 of the projection region 74, and therefore, the shape of the projection region 74 is changed.

Due to such a configuration, the respective vertexes of the projection region 74 are shifted along the respective sides of the projection region 74, and therefore, the user easily recognizes shift directions of the respective vertexes. Consequently, the user easily performs adjustment associated with geometric correction. Also, it is possible to reduce an adjustment amount in the subsequent horizontal-direction adjustment processing of the lower right vertex.

Also, in the above-described embodiment, the vertical-direction adjustment processing is performed after the horizontal-direction adjustment processing, with respect to the respective vertexes. However, there is no limitation thereto, and a configuration may be made such that the horizontal-direction adjustment processing is performed after the vertical-direction adjustment processing. In this case, a configuration is made such that a vertex of the effective element region 64 is shifted along an side of the effective element region upon the latter adjustment processing, that is, the horizontal-direction adjustment processing, and therefore, a vertex of the projection region is directly shifted in a straight line toward a vertex of the projection target region, thereby achieving the effects of the present embodiment.

Also, in the above-described embodiments, there are given examples of performing adjustment of the projection region in the order of an upper left corner, a lower left corner, a lower right corner, and an upper right corner. However, there is no limitation thereto, and a configuration may be made so as to perform adjustment on the respective vertexes in any order.

Figure 16:
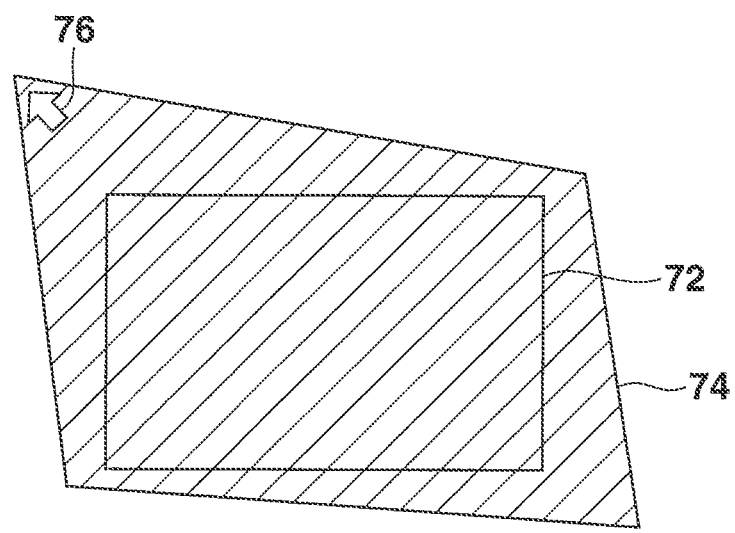
FIG. 16 is a schematic view illustrating an example of a chart for adjustment according to a modification example.

Also, as illustrated in FIG. 16, an adjustment target mark 76 indicating a vertex to be shifted in the projection region 74 by an instruction of a user may be included in an adjustment chart that is projected on the projection target object upon adjustment of geometric correction. When such an adjustment target mark 76 is included in the projection image, the user can easily recognize a vertex that is being adjusted. Although the adjustment target mark 76 is an arrow and a shifting vertex is indicated by the arrow in FIG. 16, there is no limitation thereto and the shifting vertex may be indicated by any symbol. Also, the chart for adjustment includes a straight line indicating the outline of the projection region 74, and therefore, the user easily recognizes the outline of the projection region 74 and performs adjustment of geometric correction without difficulty.

Although geometric correction in a projector using a micromirror element is illustrated as an example in the present embodiment, geometric correction according to the above embodiments and modification examples may be used for a projector using another element such as a liquid crystal element.

Although the geometric correction adjustment unit 13a is provided separately from the geometric correction unit 13b in the present embodiment, a configuration may of course be made such that the functions of the both are performed by a single control unit. Similarly, although the image transformation unit 13 is provided separately from the CPU 25 that controls operations of the image transformation unit 13, the projection processing unit 14, and the sound processing unit 30 in the present embodiment, a configuration may of course be made such that the function of the image transformation unit 13 is performed by the CPU 25 alone (single control unit).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
a projection optical system configured to project projection light on a projection target object;
an output display element having an element region including a plurality of pixels that modulate the projection light and configured to generate a projection image configured to be projected on the projection target object based on an input image by a quadrangular effective element region included in the element region;
an operation unit configured to acquire an adjustment instruction from a user to adjust the effective element region in the element region;
a geometric correction adjustment unit configured to transform the effective element region in the element region to shift a vertex of the effective element region along at least one side of two sides, each of the two sides having one end that is the vertex to be shifted, according to the adjustment instruction input to the operation unit; and
a geometric correction unit configured to perform an operation of projecting the input image on the effective element region,
wherein when a line in the projection image representing one of the side of the effective element region comes into contact with a vertex of a quadrangular projection target region of the projection target object corresponding to the vertex of the effective element region, the geometric correction adjustment unit transforms the effective element region in the element region to shift the vertex of the effective element region that is one end of the one side, along the one side.

2. The projection apparatus according to claim 1, wherein the geometric correction adjustment unit transforms the effective element region in the element region to shift the vertex of the effective element region along the two sides, each of the two sides having one end that is the relevant vertex to be shifted, according to the adjustment instruction.

3. The projection apparatus according to claim 1, wherein the geometric correction adjustment unit acquires a function of a straight line connecting the vertex that is one end of the one side and the vertex that is the other end of the one side, and transforms the effective element region in the element region by shifting the vertex of the effective element region that is the one end of the one side on the straight line.

4. The projection apparatus according to claim 1, wherein the operation unit includes a key operation unit that receives an instruction of four directions including up direction, down direction, left direction, and right direction.

5. The projection apparatus according to claim 1, wherein when the geometric correction adjustment unit transforms the effective element region, a chart for adjustment is configured to be projected on the projection target object as the projection image, and
the chart for adjustment includes a work target mark indicating the vertex that is being shifted by the geometric correction adjustment unit.

6. The projection apparatus according to claim 5, wherein the chart for adjustment includes straight lines indicating two sides, each of the two sides having one end that is the vertex of the effective element region, the vertex being shifted by the geometric correction adjustment unit.

7. The projection apparatus according to claim 5, wherein the chart for adjustment includes straight lines indicating four sides of the effective element region which is a quadrangle.

8. A geometric correction adjustment method for adjusting an effective element region in an element region in a projection apparatus, the projection apparatus including an output display element which has the element region including a plurality of pixels that modulate projection light and generates a projection image configured to be projected on a projection target object based on an input image by the quadrangular effective element region included in the element region, and projecting the projection image to the projection target object, the geometric correction adjustment method comprising:
acquiring an adjustment instruction from a user to adjust the effective element region in the element region; and
transforming the effective element region in the element region to shift a vertex of the effective element region along at least one side of two sides, each of the sides having one end that is the vertex to be shifted, according to the adjustment instruction,
wherein when a line in the projection image representing one of the side of the effective element region comes into contact with a vertex of a quadrangular projection target region of the projection target object corresponding to the vertex of the effective element region, the geometric correction adjustment unit transforms the effective element region in the element region to shift the vertex of the effective element region that is one end of the one side, along the one side.

9. A non-transitory computer readable storage medium storing codes, executed by a computer according to a method, to perform geometric correction adjustment of adjusting an effective element region in an element region in a projection apparatus, the projection apparatus including an output display element which has the element region including a plurality of pixels that modulate projection light and generates a projection image configured to be projected on a projection target object based on an input image by the quadrangular effective element region included in the element region, and projecting the projection image to the projection target object, the medium storing codes for:
acquiring an adjustment instruction from a user to adjust the effective element region in the element region; and
transforming the effective element region in the element region to shift a vertex of the effective element region along at least one side of two sides, each of the sides having one end that is the vertex to be shifted, according to the adjustment instruction,
wherein when a line in the projection image representing one of the side of the effective element region comes into contact with a vertex of a quadrangular projection target region of the projection target object corresponding to the vertex of the effective element region, the geometric correction adjustment unit transforms the effective element region in the element region to shift the vertex of the effective element region that is one end of the one side, along the one side.

* * * * *